United States Patent
Nixon

(10) Patent No.: US 9,355,551 B2
(45) Date of Patent: May 31, 2016

(54) SMART KEY LOCATOR

(71) Applicant: Toyota Motor Engineering & Manufacturing North America, Inc., Erlanger, KY (US)

(72) Inventor: Bradley B. Nixon, Macomb, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 43 days.

(21) Appl. No.: 14/519,482

(22) Filed: Oct. 21, 2014

(65) Prior Publication Data

US 2016/0110988 A1   Apr. 21, 2016

(51) Int. Cl.
G08B 1/08       (2006.01)
G08B 21/24      (2006.01)

(52) U.S. Cl.
CPC ..................... *G08B 21/24* (2013.01)

(58) Field of Classification Search
CPC ....... G08B 1/08; H04M 1/00; G07C 9/00309; H04W 12/06; H04L 63/0869
USPC ........ 340/539.32, 686.1, 686.6, 4.2, 5.1, 505, 340/3.2, 5.6, 5.61, 5.65, 5.7, 8.1; 455/556.1
See application file for complete search history.

(56) References Cited

U.S. PATENT DOCUMENTS

| | | | |
|---|---|---|---|
| 5,548,637 A | 8/1996 | Heller et al. | |
| 7,403,099 B2 | 7/2008 | Kamiya et al. | |
| 8,933,778 B2 * | 1/2015 | Birkel | B60R 25/24 340/5.54 |
| 9,187,061 B2 * | 11/2015 | Grimm | B60R 25/1001 |
| 2008/0062120 A1 | 3/2008 | Wheeler et al. | |
| 2011/0117845 A1 * | 5/2011 | Kirsch | H04M 1/6091 455/41.2 |
| 2011/0205124 A1 | 8/2011 | Shelef | |
| 2012/0214545 A1 | 8/2012 | Johnson | |
| 2015/0145648 A1 * | 5/2015 | Winkelman | G07C 9/00309 340/5.72 |

FOREIGN PATENT DOCUMENTS

CN         203290347 U     11/2013

OTHER PUBLICATIONS

JJ. Haglund, "Use Your Smartphone to Find Lost Keys", www.zagg.com (ZAGGblog), Jan. 21, 2012.

* cited by examiner

*Primary Examiner* — Toan N Pham
(74) *Attorney, Agent, or Firm* — Dinsmore & Shohl LLP

(57) ABSTRACT

The present disclosure is directed to a vehicle smart key adapted to pair with a vehicle, a system for locating a lost vehicle key, and a method of locating a lost key. The smart key, system, and method of the present disclosure enable a user of a vehicle to locate a missing or lost key for the vehicle. The smart key adapted to pair with a vehicle includes a transmitter, a receiver and an electronic control unit. The transmitter is adapted to send a locating beacon signal. The electronic control unit is programmed to execute transmission of the locating beacon signal by the transmitter when the smart key is not paired to the vehicle.

17 Claims, 3 Drawing Sheets

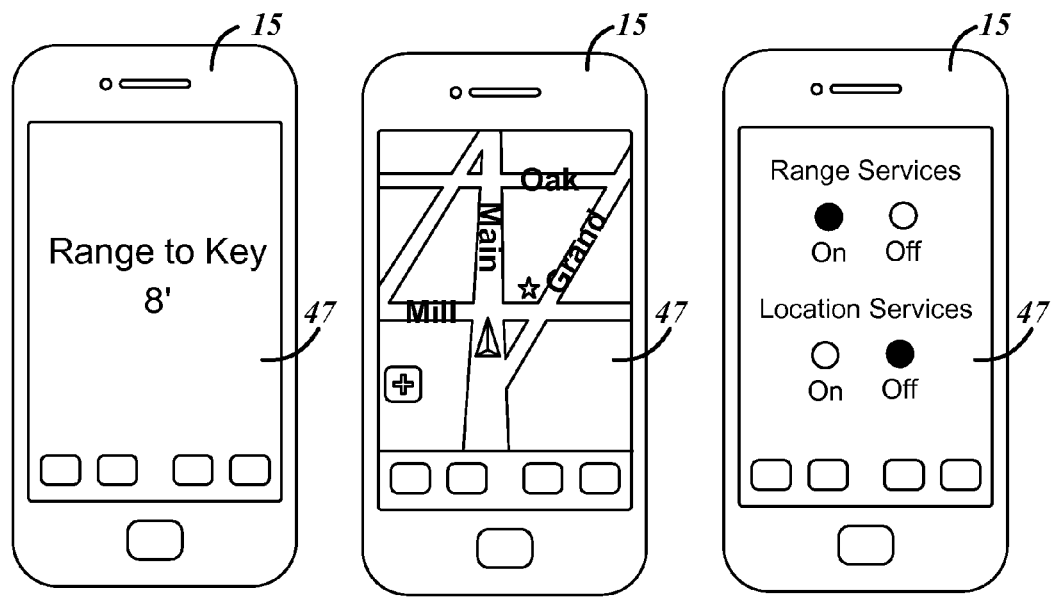
FIG. 5  FIG. 6  FIG. 7
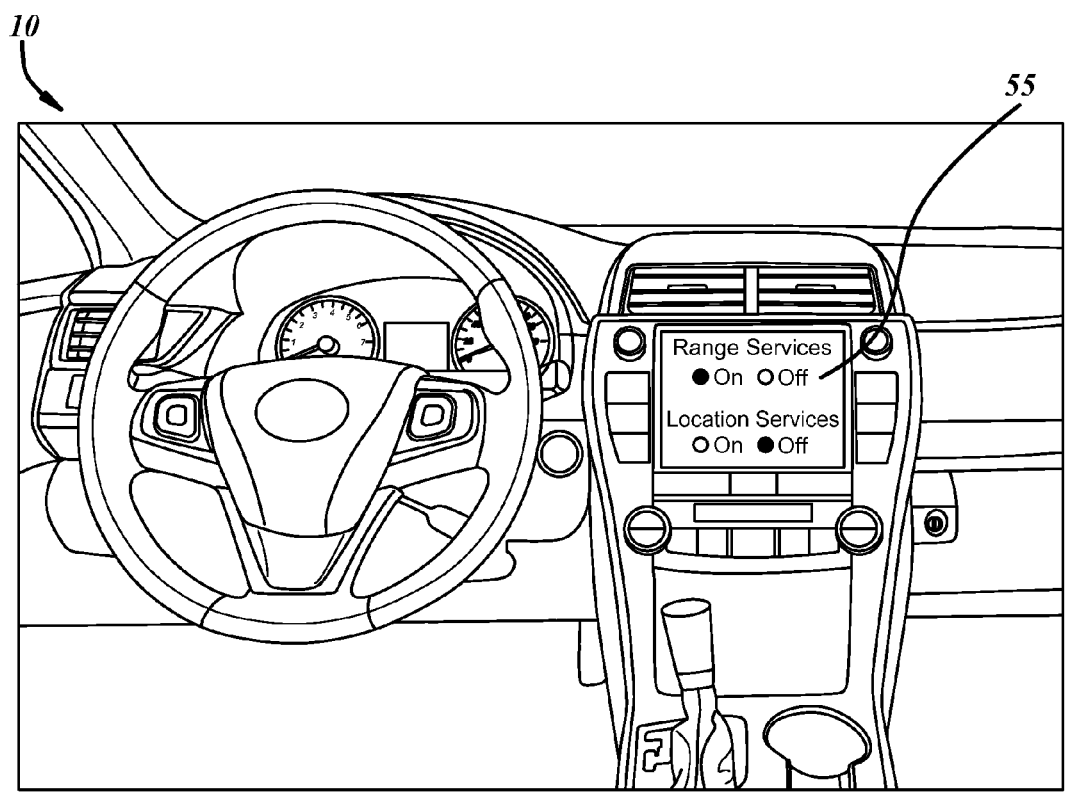
FIG. 8

SMART KEY LOCATOR

FIELD OF THE INVENTION

The present invention relates to a key for a vehicle. Specifically, to an advanced smart key and system that can be utilized to locate the smart key when it is lost or missing.

BACKGROUND OF THE INVENTION

Vehicle keys are known. Keys have traditionally been used with vehicles to lock/unlock the vehicle, and in the vehicle's ignition to start the vehicle. As keys developed, more advanced features were incorporated. Examples of such improvements include remote push button lock/unlock, "chipped" antitheft keys, remote push button start, and "keyless" smart key type systems that automatically unlock and allow push button start of the vehicle based on proximity. A more thorough description for a known type of smart key can be found in U.S. Pat. No. 7,403,099 to Kamiya et al., which is incorporated herein by reference.

A common problem to vehicle keys is that they are generally small enough to fit in a driver's pocket, and as such may be prone to being lost or misplaced. Accordingly, is it desired to develop a solution to help locate a lost or misplaced key.

SUMMARY OF THE INVENTION

The claims of the present disclosure are directed to a vehicle smart key adapted to pair with a vehicle, a system for locating a lost vehicle key, and a method of locating a lost key. The smart key, system, and method of the present disclosure enables a user of a vehicle to locate a missing or lost key for the vehicle.

The smart key adapted to pair with a vehicle includes a transmitter, a receiver and an electronic control unit. The transmitter and the receiver are in communication with the electronic control unit. The transmitter is adapted to send a locating beacon signal. The receiver is adapted to receive pairing information from the vehicle. The electronic control unit is programmed to determine when the smart key is paired to the vehicle with the pairing information received by the receiver. Additionally, the electronic control unit is programmed to execute transmission of the locating beacon signal by the transmitter when the smart key is not paired to the vehicle.

The system for locating a lost vehicle key includes a vehicle, a vehicle key, and a portable computing device.

The vehicle has a vehicle transmitter, a vehicle receiver, and a vehicle electronic control unit. The vehicle electronic control unit is in communication with the vehicle transmitter and the vehicle receiver. The vehicle electronic control unit is programmed to generate pairing information, and to transmit the paring information with the vehicle transmitter.

The vehicle key has a key transmitter, a key receiver, and a key electronic control unit. The key transmitter is adapted to send a locating beacon signal. The key receiver is adapted to receive information, including pairing information, from the vehicle. The key electronic control unit is in communication with the key transmitter and the key receiver. The key electronic control unit is programmed to determine when the smart key is paired to the vehicle with the pairing information received by the key receiver. The key electronic control unit is further programmed to execute the transmission of the locating beacon signal by the key transmitter when the smart key is not paired to the vehicle.

The portable computing device has a device receiver adapted to receive the locating beacon signal, and a device electronic control unit in communication with the device receiver. The device electronic control unit is programmed to determine the proximity of the portable computing device to the vehicle key based on the locating beacon signal.

The method of locating a lost key for a vehicle utilizes a portable computing device. To locate the key, a determination is made as to if the key is paired with the vehicle. When the key is paired with the vehicle, the portable computing device indicates that the key is in the vicinity of the vehicle. When the key is not paired with the vehicle, a determination is made as to if the key is in proximity of the portable computing device. When the key is in proximity of the portable computing device, indication is presented on the portable computing device that the key is in proximity of the portable computing device.

These and additional features provided by the embodiments described herein will be more fully understood in view of the following detailed description, in conjunction with the drawings.

BRIEF DESCRIPTION OF THE DRAWINGS

To complement this description and in order to aid in a better understanding of the invention's characteristics, a set of illustrative and non-limiting drawings is included as follows:

FIG. 5 illustrates a pictorial representation of the portable computing device displaying the range to the smart key;

FIG. 6 illustrates a pictorial representation of the portable computing device displaying the location of the smart key;

FIG. 7 illustrates a pictorial representation of the portable computing device displaying the ability to disable features of the smart key;

FIG. 8 illustrates a pictorial representation of the vehicle displaying the ability to disable features of the smart key;

DETAILED DESCRIPTION OF THE PREFERRED EMBODIMENTS

The vehicle smart key, system, and method of the present disclosure solve the problem of a lost or misplaced key by providing a smart key that is able to transmit a signal to assist in locating the smart key when misplaced. The smart key works with a vehicle to which a smart key can be paired, and with a portable computing device used to receive the signal from the smart key. To provide a more robust smart key, the signal is selectively transmitted to reduce power consumption by the transmitter. More specifically, the signal is transmitted when the smart key is unpaired with the vehicle. The smart key thereby reduces power consumption by the smart key transmitter by limiting the transmitted signal when the smart key is paired with the vehicle.

Figure 1:
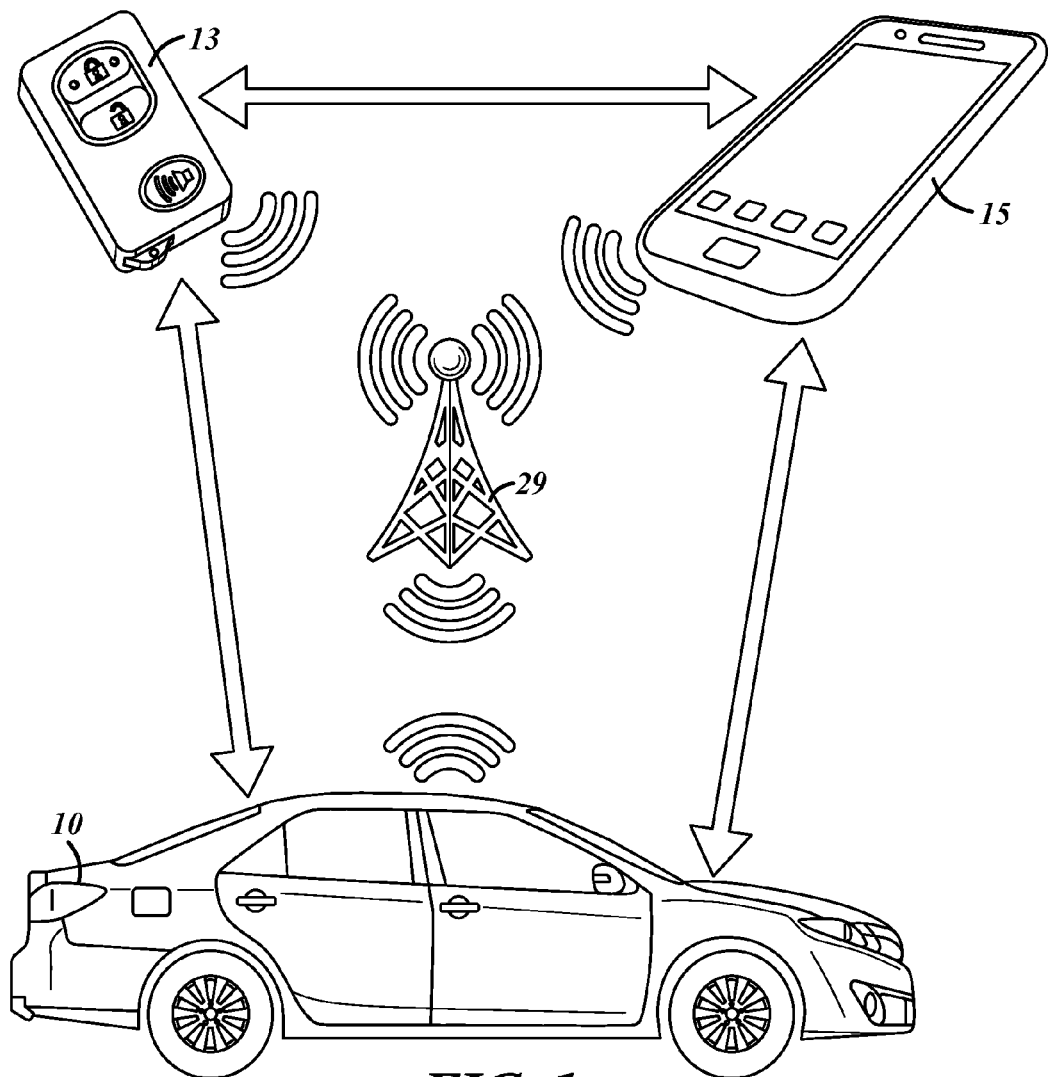
FIG. 1 illustrates a pictorial representation of a system of communication between a smart key, vehicle, and portable computing device.
Figure 2:
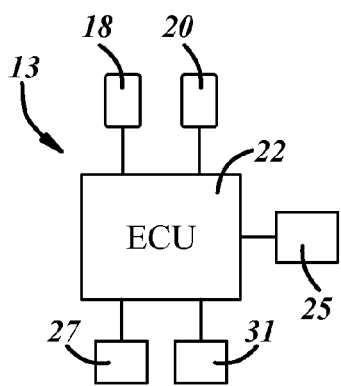
FIG. 2 depicts a block diagram of an architecture for the smart key.
Figure 3:
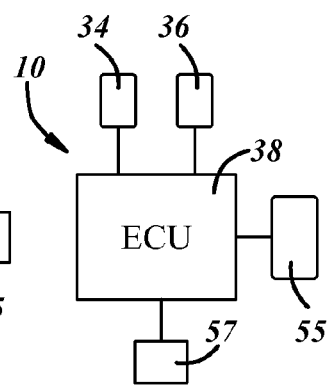
FIG. 3 depicts a block diagram of an architecture for the vehicle.
Figure 4:
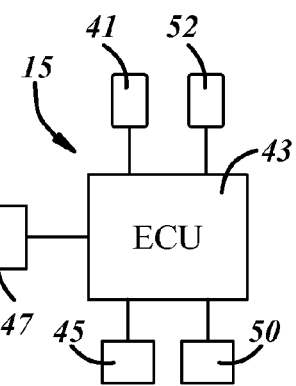
FIG. 4 depicts a block diagram of an architecture for the portable computing device.

With reference now to FIGS. 1 and 2, a vehicle 10, a smart key 13 adapted to pair with the vehicle 10, and a portable computing device 15.

The smart key 13 includes a key transmitter 18 and a key receiver 20 in communication with a key electronic control unit 22. The key transmitter 18 is adapted to transmit a locating beacon signal. The key receiver 20 is adapted to receive information, including pairing information, from the vehicle 10. The key electronic control unit 22 is programmed to determine when the smart key 13 is paired with the vehicle 10. The determination by the key electronic control unit 22 with the paring information received by the key receiver 20. When the smart key 13 is not paired with the vehicle 10, the key electronic control unit 22 is programmed to execute the transmission locating beacon signal by the key transmitter 18.

The key transmitter 18 utilizes generally short range, low power, technology. Some illustrative, but non-limiting, examples of this technology are low frequency (125 kHz) antennas, radio frequency (>300 MHz) antennas, microwave frequency antennas, electric field antennas, blue tooth technology, etc. The locating beacon signal transmitted by the key transmitter 18 allows a properly configured portable computing device 15 within range of the key transmitter 18 to approximate the distance between the smart key 13 and the portable computing device 15. For example and illustrative purposes, the distance can be approximated by the strength of the locating beacon signal. The key transmitter 18 may be powered by an individual power source, or by the key electronic control unit 22.

The key receiver 20 also utilizes generally short range, low power, technology. Some illustrative, but non-limiting, examples of this technology are low frequency (125 kHz) antennas, radio frequency (>300 MHz) antennas, microwave frequency antennas, electric field antennas, blue tooth technology, etc. The pairing information, generated by a properly configured vehicle 10, is received by the key receiver 20, and allows the key electronic control unit 22 to determine when the smart key 13 and vehicle 10 are paired. For example and illustrative purposes, the pairing information may indicate the vehicle 10 and smart key 13 are in the paired or unpaired state by including specific signal coding affirmatively indication to the smart key 13 that the smart key and vehicle 10 are paired or unpaired. Alternatively, the pairing indication may indicate the vehicle 10 and smart key are in the paired or unpaired state by the presence or absence of the key receiver 20 receiving a signal from the vehicle 10. The key receiver 20 may be powered by an individual power source, or by the key electronic control unit 22.

Key electronic control unit 22 processor, a power source, and a memory for storing programming. The key electronic control unit 22 is programmed to determine if the smart key 13 is paired or unpaired with the vehicle 10. The determination is made based on pair information the key electronic control unit 22 obtains from the key receiver 20. As discussed above, the determination can be indicated by an affirmative signal indicating the pairing state, or the presence/absence of a received signal. When the smart key 13 is not paired, as determined by the key electronic control unit 22, the key electronic control unit 22 is programmed to execute transmission of the locating beacon signal by the key transmitter 18. When the smart key 13 is determined to be paired with the vehicle 10, transmission of the locating beacon signal is not executed by the key transmitter 18.

To improve the range in which a missing key may be located, the smart key 13 also includes a key GPS unit 25, and a key cellular transmitter 27. Both the key GPS unit 25 and the key cellular transmitter 27 are in communication with the key electronic control unit 22. The key GPS unit 25 is adapted to generate location information. The key cellular transmitter 27 is adapted to transmit the location information to a cellular network 29. Transmission of the location information by the key cellular transmitter 27 is executed when the key electronic control unit 22 determines the smart key 13 is not paired to the vehicle.

To reduce power consumed by the key transmitter 18 and the cellular key transmitter 27, the transmission of the locating beacon signal and the location information may be optionally disabled by a user. To disable transmission, the information received by key receiver 20 includes a disable command. The key electronic control unit 22 is programmed to disable, or refrain from executing, transmission of the beacon signal by the key transmitter 18 when the disable command is received. Further power consumption is achieved when the key electronic control unit 22 is programmed to disable, or refrain from executing, the generation of location information by the key GPS unit 25 and the transmission of the location information by the key cellular transmitter 27 on receipt of the disable command by the key receiver 20.

To increase the range from which the smart key 13 receives the disable command, the smart key 13 includes a key cellular receiver 31. The key cellular receiver is in communication with the key electric control unit 22. When information from the cellular network 29 that includes the disable command is received by the key cellular receiver 31, the key electronic control unit 22 is programmed to disable, or refrain from executing, transmission of the beacon signal by the key transmitter 18. Similar to above, the key electronic control unit 22 is programmed to disable, or refrain from executing, the generation of location information by the key GPS unit 25 and the transmission of the location information by the key cellular transmitter 27 on receipt of the disable command by the key cellular receiver 31.

To further reduce power, transmission of the locating beacon signal and transmission of location information can be restricted to situations in when the smart key 13 is unpaired with the vehicle 10 and information including a location command is received by the key cellular receiver 31. When information from the cellular network 29 that includes the location command is received by the key cellular receiver 31, the key electronic control unit 22 is programmed to execute the generation of location information by the key GPS unit 25. Next, the generated location information is transmitted to the cellular network 29 by the key cellular transmitter 27.

With reference now to FIGS. 1-4, the vehicle 10 that is able to be paired with the smart key 13 includes a vehicle transmitter 34, a vehicle receiver 36, and a vehicle electronic control unit 38. The vehicle electronic control unit 38 is programmed to generate pairing information. The vehicle electronic control unit 38 is further programmed to execute the transmission of the pairing information by the vehicle transmitter 34.

The vehicle transmitter 34 and vehicle receiver 36 utilize generally short range, low power, technology, similar to the key transmitter 18 and key receiver 20. Some illustrative, but non-limiting, examples of this technology are low frequency (125 kHz) antennas, radio frequency (>300 MHz) antennas, microwave frequency antennas, electric field antennas, blue tooth technology, etc. The vehicle transmitter 34 and vehicle receiver 36 are used by the vehicle electronic control unit 38 to determine when the smart key 13 is in proximity with the vehicle 10. When the smart key 13 is in proximity of the vehicle 10, the smart key 13 and vehicle 10 are considered paired. When the smart key 13 is not in proximity of the vehicle 10, the smart key 13 and vehicle 10 are considered not paired or unpaired. The vehicle electronic control unit 38 generates pairing information based on the paired/unpaired determination. The pairing information is sent out through the vehicle transmitter 34.

The portable computing device 15 for locating the smart key 13 includes a device receiver 41 in communication with a device electronic control unit 43. The device receiver 41 utilizes generally short range, low power, technology, similar to the key transmitter 18 and key receiver 20. Some illustrative, but non-limiting, examples of this technology are low frequency (125 kHz) antennas, radio frequency (>300 MHz) antennas, microwave frequency antennas, electric field antennas, blue tooth technology, etc. The device receiver 41 is adapted to receive the locating beacon signal transmitted by the smart key 13. The device electronic control unit 43 is programmed to determine the proximity, or distance, of the smart key 13 based on the locating beacon signal communicated to the device electronic control unit 43 by the device receiver 41.

To facilitate the transmission of location information generated by the key GPS unit 25 through the cellular network 29, the portable computing device 15 includes a device cellular receiver 45 in communication with the device electronic control unit 43.

The portable computing device 15 also includes a device user interface 47. The device user interface 47 is in communication with the device electronic control unit 43. The device user interface 47 is adapted to communicate to a user of the portable computing device 15 the location of the smart key 13. For example, the device user interface 47 can display the range to the smart key 13 determined by the device electronic control unit 43 based on the locating beacon signal transmitted by the smart key 13. A sample of the displayed range on the device user interface 47 is shown in FIG. 5. The device user interface 47 can also display the GPS location of the smart key 13 determined by the device electronic control unit 43 based on the location information transmitted by the smart key 13. A sample of the displayed location on the device user interface 47 is shown in FIG. 6.

The portable computing device 15 further includes a device cellular transmitter 50 in communication with the device electronic control unit 43. The device cellular transmitter 50 is adapted to transmit information to the cellular network 29. The transmitted information includes a location command. Generation of the location command is performed by the device electronic control unit 43, for example, when a user requests by way of the device user interface 47. The location command is transmitted by way of the cellular network 29 to the smart key 13, as discussed above.

The portable computing device 15 is also used to disable the range and location features of the smart key 13 discussed above. The device electronic control unit 43 generates the disable command, and transmits the command to the smart key 13 with the device cellular transmitter 50 through the cellular network 29. Additionally, the portable computing device 15 includes a device transmitter 52 in communication with the device electronic control unit 43. The device transmitter 52 utilizes generally short range, low power, technology, similar to the key transmitter 18 and key receiver 20. Some illustrative, but non-limiting, examples of this technology are low frequency (125 kHz) antennas, radio frequency (>300 MHz) antennas, microwave frequency antennas, electric field antennas, blue tooth technology, etc. The device transmitter 52 is utilized to send the disable command directed to the smart key 13 with the use of the cellular network 29. A user can utilize the device user interface 47 to instruct the device electronic control unit 22 to generate and execute transmission of the disable command, as shown in FIG. 8.

The vehicle 10 may also be used to transmit the disable command to the smart key 13. The vehicle 10 includes a vehicle user interface 55 and a vehicle cellular transmitter 57, both in communication with the vehicle electronic control unit 38. A user utilizes the vehicle user interface 55 to disable the range and/or location features. The vehicle electronic control unit 38 generates the appropriate disable command depending on the user input, as shown in FIG. 8, to the vehicle user interface 55. The generated disable command is transmitted to the smart key 13 by the vehicle transmitter 34, or the vehicle cellular transmitter 57.

Figure 9:
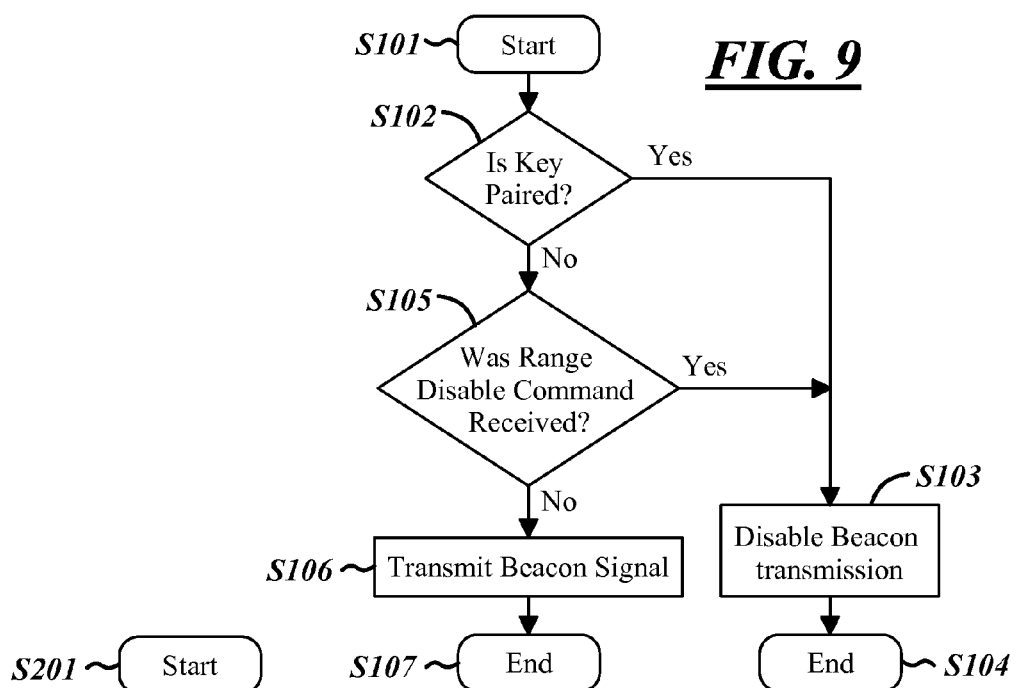
FIG. 9 depicts a flow chart of operations illustrative of a method of locating a lost key.
Figure 10:
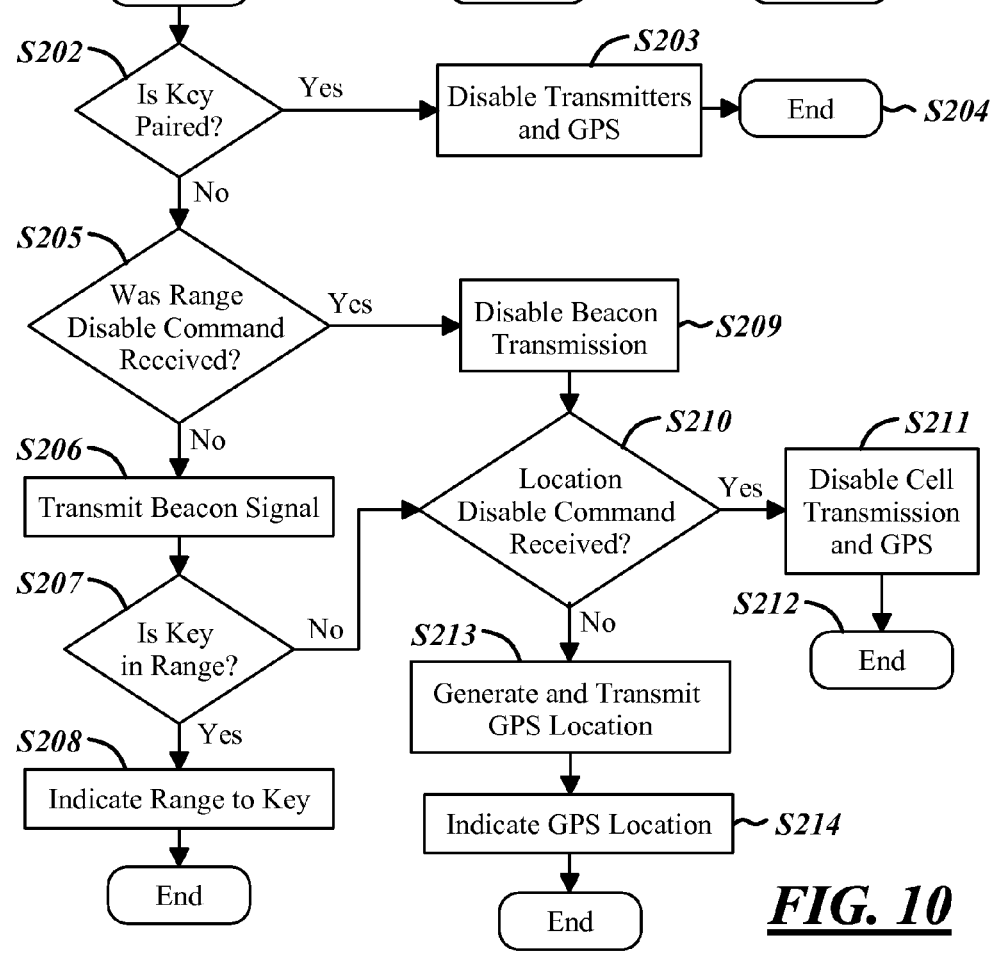
FIG. 10 depicts another flow chart of operations illustrative of a method of locating a lost key.

A method for locating a lost key utilizing the above described smart key and system is laid out in FIGS. 9 and 10.

With reference to the method laid out by the flowchart in FIG. 9, the method is initiated at S101. The initiation may be done automatically by the smart key ECU, for example at set time intervals, or it may be done when the smart key is so instructed, for example by a signal received from the portable computing device or the vehicle. A determination is then made as to whether the key is paired with the vehicle, step S102. The determination may be based on pairing information received by the smart key as discussed above. When the smart key is paired, the transmission of the beacon location signal is disabled, step S103. Disablement may be performed by the key ECU with appropriate programming. The method is then ended, step S104.

When the key is not paired, it is determined by the key ECU if a range disable command was received by the key receiver, step S105. When the range disable command has been received, the transmission of the beacon location signal is disabled, step S103. The method is then ended, step S104.

When the range disable command has not been received, transmission of the location beacon signal is executed, step S106, by the key ECU and the key transmitter. The method is then ended, step S107.

With reference to the method laid out by the flow chart in FIG. 10, the method is initiated at S201. The initiation may be done automatically by the smart key ECU, for example at set time intervals, or it may be done when the smart key is so instructed, for example by a signal received from the portable computing device or the vehicle. A determination is then made as to whether the key is paired with the vehicle, step S202. The determination may be based on pairing information received by the smart key as discussed above. When the smart key is paired, the beacon location signal is transmitted. The generation of GPS location data, and the transmission of location data are all disabled, step S203. Disablement may be performed by the key ECU with appropriate programming. The method is then ended, step S204.

When the key is not paired, it is determined by the key ECU if a range disable command was received by the key receiver, step S205. When the range disable command has been received, the transmission of the beacon location signal is disabled, step S209. It is then determined if a location disable command has been received by the key receiver, step S210.

The method is then ended, step S104. When the range disable command has not been received, transmission of the location beacon signal is executed, step S106, by the key ECU and the key transmitter. The method is then ended, step S107.

When the range disable command has not been received, transmission of the location beacon signal is executed, step S206, by the key ECU and the key transmitter. It is then determined if the smart key is in range of the portable computing device, step S207. The determination may be made for example, by the portable computing device sending a confirmation signal to the smart key after the portable computing device has received the beacon signal. If the key is determined to be in range, the range is determined and indicated on the portable computing device, step S208, and the method is ended.

When the key is not determined to be in range of the portable computing device, for example when no signal reply is received by the key from the device, it is then determined if a location disable command has been received by the key receiver, step S210.

When it is determined at step S210 that a location disable command has been received, for example by the appropriately programmed key ECU in communication with the key receiver, the generation and transmission of location data is disabled by the ECU, step S211. The method is then ended, step S212.

When it is not determined at step S210 that a location disable command has been received, location information is generated and transmitted, step S213, for example by the GPS unit and transmitter in the smart key. The GPS location is then indicated on the portable computing device at step S214, and the method is ended.

Obviously, many modifications and variations of the present invention are possible in light of the above teachings and may be practiced otherwise then as specifically described while within the scope of the appended claims.

The invention claimed is:

1. A smart key adapted to pair with a vehicle, the smart key comprising:
   a transmitter adapted to send a locating beacon signal;
   a receiver adapted to receive pairing information from the vehicle; and
   an electronic control unit in communication with the transmitter and the receiver, the electronic control unit programmed to determine when the smart key is paired to the vehicle with the pairing information received by the receiver, the electronic control unit further programmed to execute transmission of the locating beacon signal by the transmitter when the smart key is not paired to the vehicle.

2. The smart key of claim 1 further comprising:
   a GPS unit adapted to generate location information, the GPS unit in communication with the electronic control unit;
   a cellular transmitter adapted to send the location information to a cellular network, the cellular transmitter in communication with the electronic control unit;
   the electronic control unit programmed to execute the generation of location information by the GPS unit and send the location information to the cellular network by the cellular transmitter when the smart key is not paired to the vehicle.

3. The smart key of claim 2 further comprising:
   a cellular receiver adapted to receive information, including instruction information, from the cellular network, the cellular receiver in communication with the electronic control unit;
   the electronic control unit programmed to execute the generation of location information by the GPS unit and send the location information to the cellular network by the cellular transmitter when instruction information is received by the cellular receiver.

4. The smart key of claim 3 wherein the information received by the cellular receiver includes a location disable command, and the electronic control unit is programmed to refrain from sending location information to the cellular network when the location disable command is received by the cellular receiver.

5. The smart key of claim 3 wherein the information received by the cellular receiver includes a range disable command, and the electronic control unit is programmed to refrain from sending the location beacon signal when the range disable command is received by the cellular receiver.

6. A system for locating a lost vehicle key, the system comprising:
   a vehicle having a vehicle transmitter, a vehicle receiver, and a vehicle electronic control unit, the vehicle electronic control unit in communication with the vehicle transmitter and the vehicle receiver, the vehicle electronic control unit programmed to generate pairing information and to transmit the pairing information with the vehicle transmitter;
   a vehicle key having a key transmitter, a key receiver, and a key electronic control unit, the key transmitter adapted to send a locating beacon signal, the key receiver adapted to receive information, including pairing information, from the vehicle, and the key electronic control unit in communication with the key transmitter and the key receiver, the key electronic control unit programmed to determine when the vehicle key is paired to the vehicle with the pairing information received by the key receiver, the key electronic control unit further programmed to execute transmission of the locating beacon signal by the key transmitter when the vehicle key is not paired to the vehicle; and
   a portable computing device having a device receiver adapted to receive the locating beacon signal, and a device electronic control unit in communication with the device receiver, the device electronic control unit programmed to determine proximity of the portable computing device to the vehicle key based on the locating beacon signal.

7. The system of claim 6 further comprising:
   the vehicle key including a GPS unit adapted to generate location information, the GPS unit in communication with the key electronic control unit, and a key cellular transmitter adapted to send the location information to a cellular network, the key cellular transmitter in communication with the key electronic control unit, the key electronic control unit programmed to execute the generation of location information by the GPS unit and send the location information to the cellular network by the key cellular transmitter when the vehicle key is not paired to the vehicle; and
   the portable computing device including a device cellular receiver in communication with the device electronic control unit, the device cellular receiver adapted to receive location information from the cellular network.

8. The system of claim 7 further comprising:
   the portable computing device including a device cellular transmitter adapted to send information, including a location command;
   the vehicle key including a key cellular receiver adapted to receive information, the key electronic control unit programmed to execute the generation of location information by the GPS unit and send the location information to the cellular network by the key cellular transmitter when instruction information is received by the key cellular receiver.

9. The system of claim 8 further comprising:
   the instruction information including a disable command;
   the key electronic control unit programmed to disable the generation of location information and the transmission of the locating beacon signal when instruction information including the disable command is received by the key cellular receiver.

10. The system of claim 7 further comprising:
the vehicle including a cellular transmitter in communication with the vehicle electronic control unit, the vehicle electronic control unit programmed to generate instruction information including a disable command, and send out the information including the disable command with the vehicle cellular transmitter;
the vehicle key including a key cellular receiver in communication with the key electronic control unit, the key electronic control unit programmed to disable the transmission of the locating beacon signal and the generation of location information by the GPS unit when instruction information including the disable command is received by the key cellular receiver.

11. The system of claim 6 further comprising:
the vehicle electronic control unit programmed to generate instruction information including a disable command, and send out the information including the disable command with the vehicle transmitter;
the key electronic control unit programmed to disable the transmission of the locating beacon signal when instruction information including the disable command is received by the key receiver.

12. A method of locating a lost key for a vehicle utilizing a portable computing device comprising:
determining if the key is paired with the vehicle; and
transmitting a beacon locating signal from the key when the key is not paired with the vehicle.

13. The method of claim 12 further comprising:
disabling the transmission of the beacon location signal and location information when the key is paired with the vehicle.

14. The method of claim 12 further comprising:
generating and transmitting location information with the key when the key is not paired with the vehicle.

15. The method of claim 14 further comprising:
disabling the generation and transmission of location information by the key when the key is paired with the vehicle.

16. The method of claim 12 further comprising:
determining if a location disable command has been received by the key; and
generating and transmitting location information with the key when the key is not paired with the vehicle and the location disable command has not been received by the key.

17. The method of claim 12 further comprising:
determining if a location disable command has been received by the key; and
disabling the generation and transmission of location information by the key when the key is paired with the vehicle.

* * * * *